March 4, 1930.  J. A. McQUAIL  1,749,350
COAL WASHING APPARATUS
Filed Nov. 12, 1925  2 Sheets-Sheet 2

Patented Mar. 4, 1930

1,749,350

UNITED STATES PATENT OFFICE

JAMES ANTHONY McQUAIL, OF HIAWATHA, WEST VIRGINIA, ASSIGNOR TO THE JEFFREY MANUFACTURING COMPANY, OF COLUMBUS, OHIO, A CORPORATION OF OHIO

COAL-WASHING APPARATUS

Application filed November 12, 1925. Serial No. 68,713.

The present invention relates to certain new and useful improvements in coal washing apparatus, and particularly to coal washing apparatus of the class in which coal may be subjected to agitation in the presence of currents of water, to be separated thereby from impurities of greater specific gravity.

The type of coal washing apparatus to which this invention particularly relates consists preferably of a conical tank having an inlet for the washing water at the lower and smaller end of the tank, and provided with stirring devices adapted to agitate the mixture within the tank. Mixtures of coal and heavier impurities may be fed into the open top of the tank, and will be separated by the combined action of the upwardly flowing currents of water and the agitation created by the stirring devices, the lighter particles of coal passing over the upper edge of the tank with the outflowing water, and the heavier refuse material settling to the bottom of the tank where suitable valves are arranged to control the removal of the refuse sediment.

Coal washing machinery is commonly desirable in regions which are more or less deficient of water supply, and, oftentimes, the use of such machinery is possible in such regions only with rigid economy of washing water. Machines of the type referred to, as heretofore constructed, discharge a considerable amount of water with the refuse material, and the proportion of this waste water to the total water supply is often such as to seriously curtail the usefulness of the apparatus. A further disadvantage accompanying the escape of washing water from the apparatus with the refuse material is that the water so lost commonly drains into adjacent creeks or rivers producing an extremely undesirable stream pollution.

It is the especial object of this invention to provide in a coal washing apparatus of the class described, means to separate the water from the refuse material before the discharge of such refuse material from the washing apparatus, and return the water thus reclaimed to the main water supply.

The means whereby I attain this object are fully set forth in the following specification, and illustrated in the accompanying drawings of which—

Like numerals refer to similar parts in the several figures.

Figure 1:
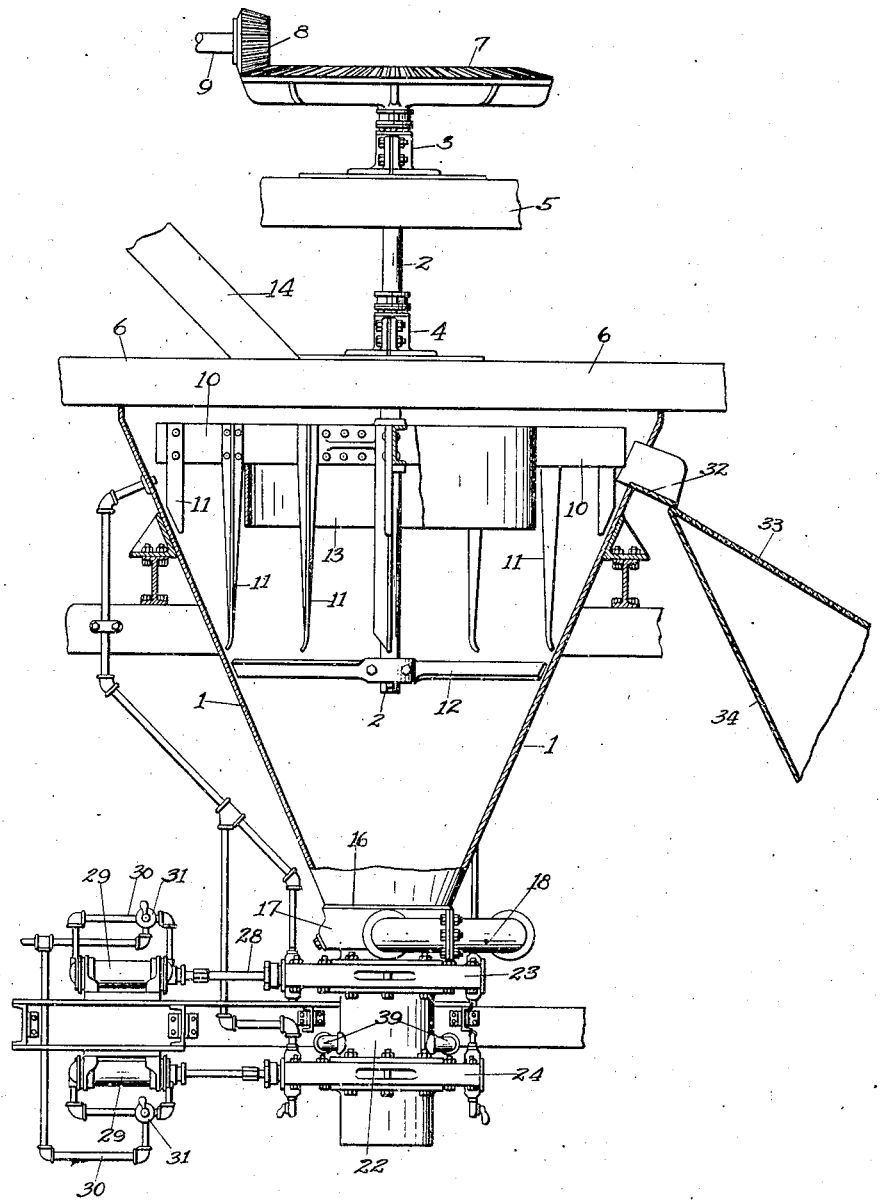
Fig. 1 is a side elevation of a coal washing apparatus equipped with the devices of my invention, certain parts being broken away to disclose other parts.
Figure 2:
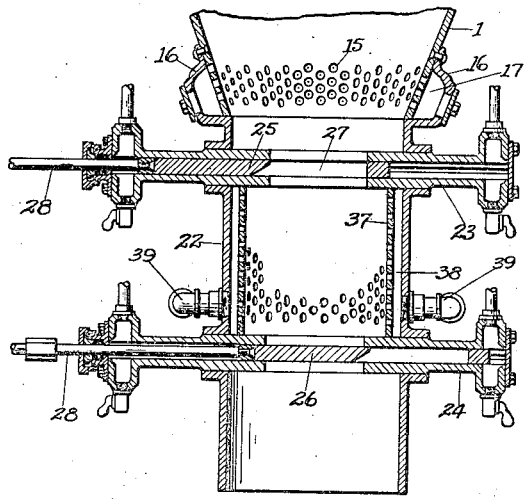
Fig. 2 is a fragmentary sectional view taken along the vertical central plane of the devices illustrated in Fig. 1 showing the refuse water reclaiming devices on an enlarged scale.
Figure 3:
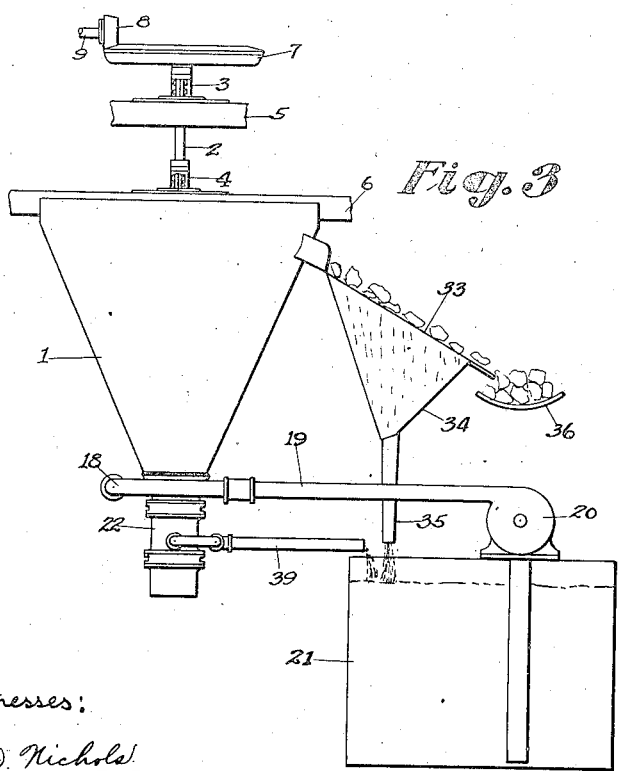
Fig. 3 is a diagrammatic illustration of the general arrangement of a coal washing machine equipped with the devices of my invention, showing particularly the relation to the wash water supply.

As shown in the drawings, the coal washing apparatus to which my present invention is applied in the present disclosure, illustrative of one form, comprises a tank 1 of inverted cone shape, with its axis vertically disposed and having an open top. Into the tank 1 depends a shaft 2 which is concentric with the axis of the tank, and is supported in suitable journal bearings 3 and 4 attached to any convenient supporting element, such as the horizontal member 6. The shaft 2 is rotatable about its axis, and may be connected in any suitable manner with any convenient source of power. For purposes of illustration, I have here shown a bevel gear 7 attached to the upper end of the shaft 2, and this bevel gear is engaged by a bevel pinion 8 attached to the horizontal power shaft 9. Attached to the shaft 2 below the level of the upper edge of the tank 1 and revolving with said shaft, are the cross arms 10 to which are attached a plurality of downwardly projecting fingers 11 adapted to stir the contents of the tank when the shaft revolves. A second cross arm 12 attached to the shaft 2 below the lower ends of the fingers serves as an auxiliary stirring device, and, as here shown, may be so fashioned as to act as an impeller and assist the upward movement of the contents of the tank. A cylindrical sleeve 13 attached to the cross arm 10 concentric with the shaft 2, serves to divide the unwashed mixture of coal and refuse coming from the feed spout 14 from the washed coal in the upper part of the tank 1, as will hereinafter appear.

The conical tank 1 is truncated, affording an opening through which the material may be discharged, and immediately above this opening the wall of the tank is provided with a zone of apertures 15 through which the washing water is admitted. The base casting 16 snugly fits the lower portion of the cone 1 to which it is secured by suitable rivets or other fastening devices, and in this casting is formed a bustle or enlargement 17 communicating with the apertures 15. The bustle 17 is connected through branch pipes 18 with a supply pipe 19 extending to any convenient source of fluid pressure supply, here shown, for purposes of illustration, as a centrifugal pump 20 arranged to draw water from the supply reservoir 21.

Attached to the base casting 16 is a downwardly projecting cylindrical extension 22 which forms a refuse chamber, and at the top and bottom of this extension are valve boxes 23 and 24 in which are mounted valve plates 25 and 26 for the control of the passage of refuse material into and out of the refuse chamber. As here shown each valve box is rectangular in cross section, and constitutes a slideway in which are longitudinally reciprocable the valve plates 25 and 26 respectively. The valve plates 25 and 26, in the example here shown, are of corresponding cross section and their opposite faces are flat and parallel. The proportions of the parts are such that the valves completely close the slideways to effectively shut off the flow of water and refuse material therethrough. The valve boxes 23 and 24 and their associated valves 25 and 26, being similar, a description of one applies to both. The plate 25 is provided near one end with a substantially circular aperture 27 adapted to register with the refuse chamber when the plate 25 is at one extremity of its reciprocatory movement, to permit the flow of material therethrough. The plate 25 is attached to a piston rod 28 connected with a suitable piston (not shown) adapted to be reciprocated within a cylinder 29. Fluid pressure for the reciprocation of the piston may be derived from any convenient source of fluid supply, and admitted to the cylinder 29 through the pipe 30, a valve 31 being provided to control the fluid pressure and the movement of the valve 25.

During the operation of the apparatus the valves 25 and 26 are alternately opened and closed, thereby preventing the escape of water from the tank while allowing the refuse material to enter the refuse chamber and to be discharged therefrom. Mixed material, which is to be separated, is delivered to the upper portion of the tank inside the sleeve 13 through a suitable conductor spout 14, the sleeve 13 serving to keep the incoming material from directly mingling with the washed material in the upper part of the tank. This mixed material works downwardly through the action of the stirring fingers until it meets the upwardly flowing current of water. Due to the difference of specific gravity of the constituent materials a separation is affected by the action of the water, the clean coal working upwardly under the action of the current, and being discharged with the water through the overflow weir 32. This washed coal is preferably discharged by the weir 32 directly onto a dewatering screen 33 whereby the coal is separated from the water, the water flowing through the hopper 34 and return pipe 35 into the main water supply reservoir 21. The washed coal passes over the dewatering screen 33 and may be disposed of in any preferred manner as by the conveyor 36. The refuse material works downwardly of the conical tank into the refuse chamber, and when this chamber becomes full of refuse material the operator may by the manipulation of the valve 31, close the upper valve 25 and open the lower valve 26 to discharge the refuse material from the refuse chamber. After the refuse chamber has been thus emptied, the lower valve 26 may be again closed and the upper valve 25 again opened. By proper manipulation of the valves 25 and 26 refuse may be withdrawn from the apparatus without material loss of clean coal.

A considerable amount of water is necessarily entrained in the spaces between adjacent fragments of the refuse material in the refuse chamber, and machines heretofore constructed have discharged this entrained water with the refuse material through the lower valve 26. The amount of water thus lost varies directly with the size of the fragments constituting the refuse material, and the proportionate variation in the size of the spaces between said fragments. The amount of water thus lost ranges commonly from one to two, or even three percent, of the water used. To prevent such loss of water I have provided means to separate the water from the refuse material before said refuse material is discharged from the machine, the water thus reclaimed being returned to the main water supply. To this end I have provided a cylindrical strainer 37 positioned concentrically with the sleeve 22, and extending from the valve 25 to the valve 26. The strainer 37 consists of a cylinder of perforated sheet metal of such diameter that a secondary chamber 38 is formed between said strainer and the cylinder 22, into which water may drain from the refuse material within the refuse chamber. A drain pipe 39 connected with this drainage chamber 38 is provided to conduct this reclaimed water to the main supply tank 21.

What I claim is:—

In a coal washing apparatus, a liquid-containing tank wherein the coal is separated from intermixed refuse material, the coal being permitted to pass out of said tank and the refuse material being permitted to accumulate at the bottom thereof, a chamber with a perforate lateral wall disposed beneath the tank, a slide valve between the tank and chamber, the refuse material at the bottom of the tank being permitted to gravitate into said chamber when said valve is open, a slide valve at the bottom of said chamber to temporarily confine the refuse material therein, a solid wall surrounding the perforate wall of said chamber in spaced relation thereto to form a drain pocket, and a valve controlled exhaust opening at the bottom of said pocket, whereby, said slide valves being closed and a charge of refuse material being confined in said chamber, the latter may be drained by opening the valve at the exhaust opening without the loss of liquid from said tank.

In testimony whereof I have hereunto set my hand.

JAMES ANTHONY McQUAIL.